Nov. 25, 1969     V. J. MODIANO     3,480,868
LARGE ERROR SERVO OSCILLATION INHIBITOR
Filed Feb. 13, 1967     2 Sheets-Sheet 1

INVENTOR.
VICTOR J. MODIANO,
BY
Robert H. Himes
ATTORNEY.

INVENTOR.
VICTOR J. MODIANO,
BY
Robert H. Himes
ATTORNEY.

United States Patent Office 3,480,868
Patented Nov. 25, 1969

3,480,868
LARGE ERROR SERVO OSCILLATION INHIBITOR
Victor J. Modiano, Anaheim, Calif., assignor to Hughes Aircraft Company, Culver City, Calif., a corporation of Delaware
Filed Feb. 13, 1967, Ser. No. 615,528
Int. Cl. H03k 5/00; H02p 3/00
U.S. Cl. 328—132                                6 Claims

ABSTRACT OF THE DISCLOSURE

The subject invention constitutes a non-linear circuit which provides a signal proportional to error rate only when the error is decreasing in absolute magnitude. In operation, the apparatus of the invention inhibits overshooting by commencing deceleration prior to the time zero position is reached whereby when zero error is reached the error rate is near zero. Thus, it is possible to use maximum position velocities at all times when the error is increasing.

---

The invention herein described was made in the course of or under a contract or subcontract thereunder with the Department of the Army.

BACKGROUND OF THE INVENTION

Field of invention

The subject invention relates to servo positioning apparatus and more particularly to a non-linear circuit for decelerating apparatus being positioned only when the magnitude of the error positioning signal commences to decrease.

Description of the prior art

It has been the practice to employ stabilizing circuits to generate signals proportional to the rate of change of error signal and other signals proportional to the rate of change of positioning velocity. These systems are often not applicable to situations where positioning power must be limited to avoid damage to equipment.

SUMMARY OF THE INVENTION

In accordance with the present invention, unilateral circuits are employed to generate signals of positive or negative polarity that are proportional to the maximum positive and negative excursions, respectively, of an error signal. These signals are applied to respective capacitors having respective outputs clamped to ground so long as the error signal is of increasing magnitude. Only upon decrease of the error signal, does the output of the appropriate capacitor undergo a voltage excursion which is then amplified and employed as a decelerating voltage. In situations where the error signal is likely to include noise, the circuit is altered in a manner to control the charging rate of the aforementioned capacitors so as not to generate erroneous decelerating signals.

DESCRIPTION OF THE PREFERRED EMBODIMENTS

Figure 1:
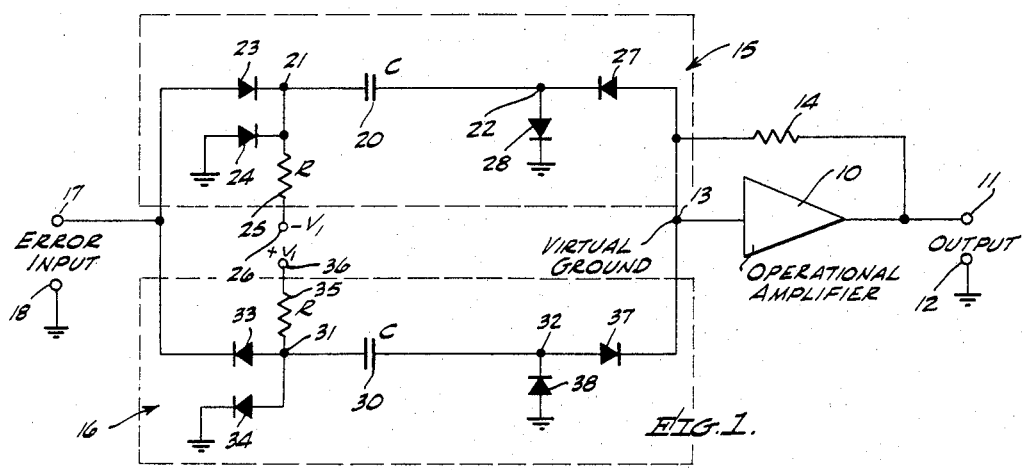
FIG. 1 illustrates a basic embodiment of the present invention.

Referring now to FIG. 1 of the drawings there is shown a basic embodiment of the present invention for generating a "braking voltage" only when the error signal commences to decrease in magnitude. In particular, the basic embodiment includes an operational amplifier 10 having output terminals 11, 12, terminal 12 being referenced to ground, and an input terminal 13. Input terminal 13 is maintained at a virtual ground by means of current flow through a feedback resistor 14 connected therefrom to the output terminal 11.

The apparatus further includes channels 15, 16 connected from the input terminal 13 of operational amplifier 10 to error input terminals 17, 18, the latter terminal 18 being referenced to ground. Channel 15 is adapted to generate a braking signal when the error signal applied to error input terminal 17 is initially of positive polarity and channel 16 is adapted to generate braking signal when the error signal applied to error input terminal 17 is initially of negative polarity.

Channel 15 includes a capacitor 20 of capacitance C connected from an intermediate junction 21 to an intermediate junction 22. Diodes 23, 24 are connected, respectively, from error input terminal 17 and from ground to intermediate junction 21 and are both poled to allow current flow towards the intermediate junction 21. In addition, intermediate junction 21 is connected through a resistor 25 of resistance R to a terminal 26 that is maintained at a potential of $-V_1$ volts. Lastly, diodes 27, 28 are connected from intermediate junction 22 to the input terminal 13 of operational amplifier 10 and to ground, respectively, the diode 27 being poled to allow current flow towards the intermediate junction 22 and the diode 28 being poled to allow current flow away from intermediate junction 22 towards ground.

Channel 16, on the other hand, includes a capacitor 30 of capacitance C connected from an intermediate junction 31 to an intermediate junction 32. Diodes 33, 34 are connected respectively, from error input terminal 17 and from ground to intermediate junction 31 and are both poled to allow current flow away from intermediate junction 31. In addition, intermediate junction 31 is connected through a resistor 35 of resistance R to a terminal 36 maintained at a potential of $+V_1$ volts. Lastly, diodes 37, 38 are connected from intermediate junction 32 to the input terminal 13 of operational amplifier 10 and to ground, respectively, the diode 37 being poled to allow current flow away from intermediate junction 32 and the diode 38 being poled to allow current flow towards the intermediate junction 32.

In operation, current normally flows from ground through the diode 24 and the resistor 25 to terminal 26 and from terminal 36 through resistor 35 and diode 34 to ground. An error signal of positive polarity propagates through channel 15 wherein it decouples diode 24 causing capacitor 20 to charge in a positive direction. The side of capacitor 20 connected to intermediate junction 22, however, discharges through diode 28 whereby no signal appears at the input 13 of the operational amplifier 10. Assuming ideal diodes, then at the instant the error signal commences to decrease, the side of capacitor 20 connected to intermediate junction 22 goes negative thereby drawing current through diode 27. The flow of current through diode 27 tends to decrease the potential at the input terminal 13 of operational amplifier 10. The operational amplifier 10, however, generates an output signal at the output terminal 11 thereof of sufficient magnitude to cause current to flow through resistor 14 to maintain the input terminal 13 at virtual ground. The polarity of the signal at output terminal 11 is opposite to that required to position the system to zero error whereby it may be referred to as a "braking signal."

An error signal of negative polarity propagates through channel 16 wherein it decouples diode 34 and allows capacitor 30 to charge in a negative direction. The side of capacitor 30 connected to intermediate junction 32 discharge through diode 38 whereby no signal appears at the input 13 of operational amplifier 10. At the instant the error signal commences to decrease in magnitude, however, the side of capacitor 30 connected to intermediate junction 32 starts a positive excursion thereby decoupling diode 38 and causing current to flow through diode 37 towards the input 13 of operational amplifier 10. As before, input terminal 13 is maintained at virtual ground by an appropriate current flow through resistor 14 due to a signal developed at the output terminal 11 by the operational amplifier 10. This signal is of a polarity opposite from that required to position the system to zero error whereby it is termed a "braking signal."

It has been found that it is desirable to minimize the effects of noise in the error signal. In order to keep the current through diode 27 or 37 free of noise spikes, it is important that the current through resistor 25 or resistor 35 be only slightly greater than the current in capacitors 20 or 30 due to maximum error rate. As a consequence, if the error rate is expected to diminish as the error magnitude deceases, then the potential $V_1$ should be the minimum voltage practical.

Figure 2:
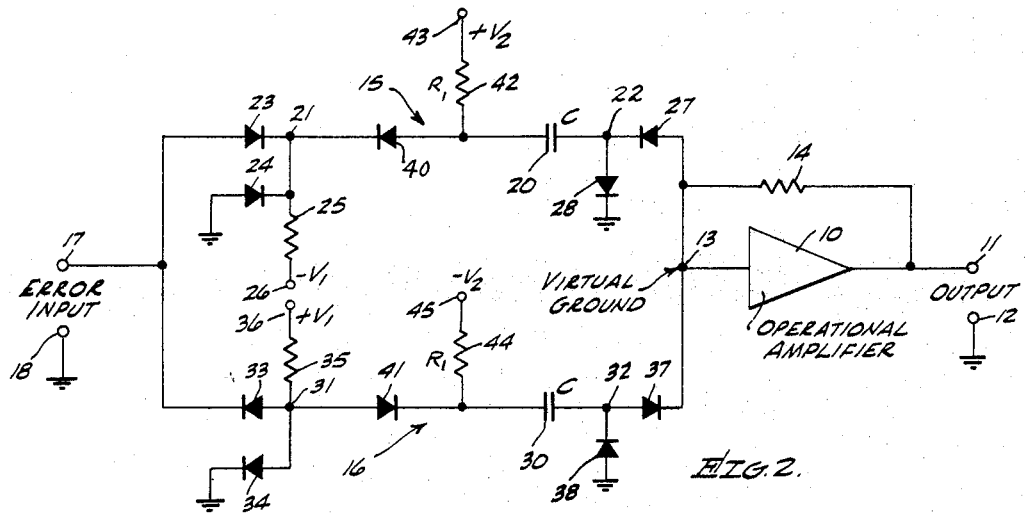
FIGS. 2 and 3 illustrate embodiments of the present invention including additional circuitry for minimizing the detrimental effect of noise.

Referring now to FIG. 2, wherein like reference numerals designate like components, there is shown an embodiment of the present invention for use when noise may appear on the input error signal and where error signals less than approximately 0.5 volt are not important. In particular, in the apparatus of FIG. 2 a diode 40 is inserted between intermediate junction 21 and capacitor 20 and a diode 41 is inserted between intermediate junction 31 and capacitor 30, the diode 40 being poled to allow current flow towards intermediate junction 21 and the diode 41 being poled to allow current flow towards capacitor 30. In addition, the junction between diode 40 and capacitor 20 is connected through a resistor 42 of resistance $R_1$ to a terminal 43 and the junction between diode 41 and capacitor 30 is connected through a resistor 44 of resistance $R_1$ to a terminal 45. The terminals 43, 45 are maintained at potentials $+V_2$ and $-V_2$, respectively. In operation, current flow through the resistors 42, 44 causes the charge on the capacitors 20, 30, respectively, to follow the potential on junctions 21, 31 provided that it does not change faster than allowed by the time constant $R_1C$. Thus, in actual practice $R_1C$ is chosen to accommodate a maximum rate of change of error signal whereby the charge on capacitors 20 or 30 cannot follow large noise spikes or other transients.

Figure 3:
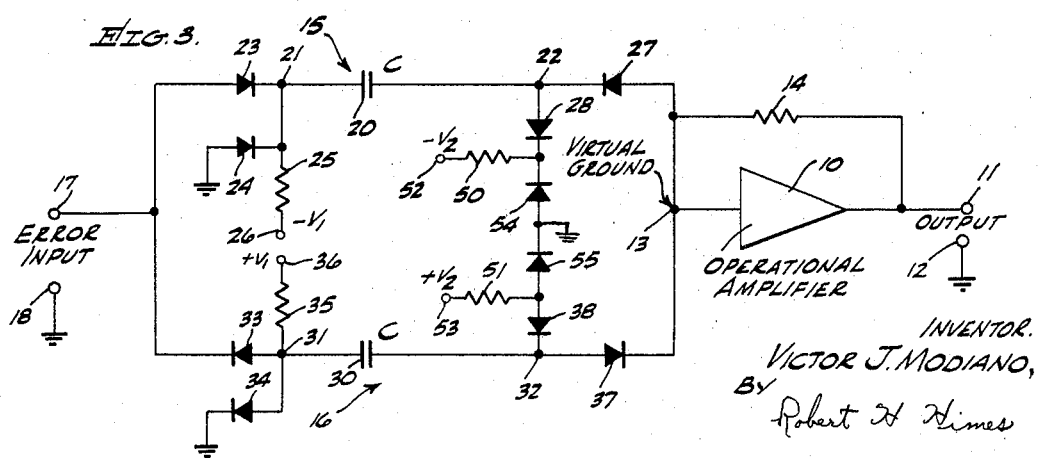

Referring to FIG. 3 of the drawings, wherein like reference numerals designate like components, there is shown an embodiment of the apparatus of FIG. 1 with additional circuitry to keep the current through diodes 27, 37 free of noise spikes and to operate more satisfactorily at signal levels less than 0.5 volt. In particular, the ground connections of the diodes 28, 38 in the apparatus of FIG. 1 are lifted and connected through resistors 50, 51, respectively, of resistance $R_1$ to terminals 52, 53 which are maintained at potentials of $-V_2$ and $+V_2$ volts. In addition, the lifted extremities of diodes 28, 38 are connected through diodes 54, 55, respectively, to ground, the diode 54 being poled to allow current flow away from ground and the diode 55 being poled to allow current flow towards ground.

In operation, current flow through the resistors 50, 51 and diodes 54, 55, respectively, maintains the lifted extremities of diodes 28, 38 at substantially ground potential. When capacitor 20 is charged in a positive direction or when the capacitor 30 is charged in a negative direction, the respective dodes 54 or 55 decouple slightly thereby causing the capacitor 20 or 30 to discharge through the resistance $R_1$ of the resistors 50 or 51. By appropriate selection of the time constant $R_1C$, the system may be limited to respond only to the maximum allowed rate of change or error signal and thus avoid responding to noise spikes or other transients. This is achieved by making the current through resistors 50 or 51 slightly greater than the current in capacitors 20 or 30 due to maximum error rate. Also, the same criteria should be used in determining optimum current flow through resistors 25, 35 as was used in the apparatus of FIG. 1.

Figure 4:
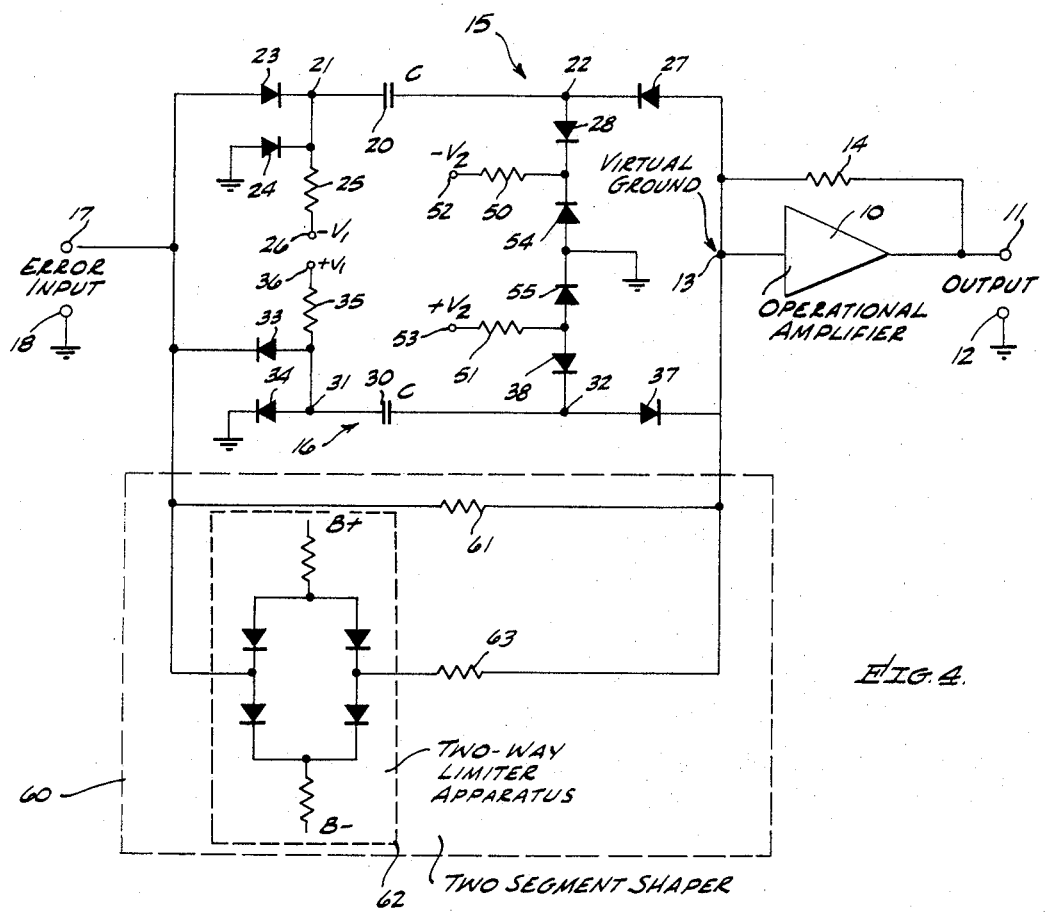
FIG. 4 illustrates the apparatus of FIG. 3 connected in parallel with a two-segment shaper circuit for providing an error positioning signal.
Figure 5:
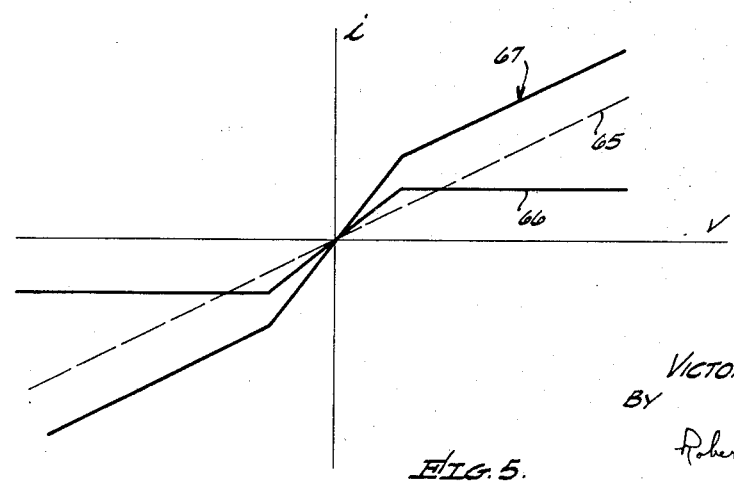
FIG. 5 illustrates voltage and current characteristics of the two-segment shaper circuit of the apparatus of FIG. 4.

Referring to FIG. 4 there is shown the apparatus of FIG. 3 connected in parallel with a two-segment shaper circuit 60 for generating a complete error positioning signal. The first segment of the two-segment shaper circuit 60 constitutes a resistor 61 connected directly from error input terminal 17 to input terminal 13 of the operational amplifier 10. The second segment of the two-segment shaper 60 constitutes a two-way limiter apparatus 62 in series with a resistor 63 which is connected in parallel with the resistor 61. Referring to FIG. 5, there is shown voltage-current waveforms developed by the two-segment shaper 60. In particular, a dashed line waveform 65 represents the voltage-current characteristic across the resistor 61 and the solid line waveform 66 represents the voltage-current characteristic across the series combination of the two-way limiter 62 and resistor 63. The composite of the waveforms 65, 66 make the voltage-current characteristic of the two-segment shaper 60 represented by the waveform 67. It can be shown that when error rate is greater than or equal to $\sqrt{2AE_0}$ where A is the maximum decelerating rate and $E_0$ is the error, deceleration should be performed at the rate A in order to stop at zero error. An example of an approximation of this relationship is illustrated by the waveform 67, FIG. 5 generated by the two segment shaper 60 of FIG. 4.

I claim:

1. In a servo-positioning system, a non-linear apparatus for generating a braking voltage commencing with a decrease in the magnitude of an error signal applied thereto, said apparatus comprising:
   (a) first and second capacitors each having first and second sides, respectively;
   (b) first means responsive to said error signal and connected to said first side of said first capacitor for charging said first capacitor to positive potentials substantially equal to the peak positive excursions of said error signal;
   (c) second means responsive to said error signal and connected to said first side of said second capacitor for charging said second capacitor to negative potentials substantially equal to the peak negative excursions of said error signal;
   (d) first unilateral means connected to the respective second sides of said first and second capacitors for discharging said second sides thereof at a predetermined rate during the changing of said respective first sides;
   (e) an operational amplifier having an input and an output;
   (f) a feedback resistor connected from said input to said output of said operational amplifier; and
   (g) second unilateral means connected from the respective second sides of said first and second capacitors at the said input of said operational amplifier for discharging potentials thereon generated by a decrease in magnitude of said error signal through said feedback resistor thereby to generate said braking voltage at the output of said operational amplifier.

2. The apparatus as defined in claim 1 which additionally includes means interposed between said respective first sides of said first and second capacitors and said first and second means responsive to said error signal for limiting the rate at which said first and second capacitors may be charged thereby to prevent said servo-positioning system from responding to noise in said error signal.

3. In a servo positioning system, a non-linear apparatus for generating a positioning signal in response to an error signal, said positioning signal being designed to minimize over-shooting of the zero error position, said apparatus comprising:
   (a) an input junction adapted to receive said error signal;
   (b) an operational amplifier having an input and an output;
   (c) a feedback resistor connected from the input to the output of said operational amplifier;
   (d) a first resistor connected directly from said input junction to said input of said operational amplifier;
   (e) a two-way limiting apparatus and a second resistor connected in series from said input junction to said input of said operational amplifier;
   (f) first and second capacitors each having first and second sides, respectively;
   (g) first means connected from said input junction to said first side of said first capacitor for charging said first capacitor to positive potentials substantially equal to the peak positive excursions of said error signal;
   (h) second means connected from said input junction to said first side of said second capacitor for charging said second capacitor to negative potentials substantially equal to the peak negative excursions of said error signal;
   (i) first unilateral means connected to the respective second sides of said first and second capacitors for discharging said second sides thereof at a predetermined rate during the charging of said respective first sides; and
   (j) second unilateral means connected from the respective second sides of said first and second capacitors to the input of said operational amplifier for discharging potentials thereon generated by a decrease in magnitude of said error signal through said feedback resistor thereby to generate said positioning signal at the output of said operational amplifier.

4. In a servo-positioning system, a non-linear apparatus for generating a braking voltage commencing with a decrease in the magnitude of an error signal applied thereto, said apparatus comprising:
   (a) an operational amplifier having an input and an output;
   (b) a feedback resistor connected from said input to said output of said operational amplifier;
   (c) an input junction adapted to receive said error signal;
   (d) a first capacitor connected from a first junction to a second junction and a second capacitor connected from a third junction to a fourth junction;
   (e) first and second diodes connected, respectively, from said input junction and from ground to said first junction, said first and second diodes being poled to allow current flow towards said first junction;
   (f) third and fourth diodes connected, respectively from said input junction and from ground to said third junction, said third and fourth diodes being poled to allow current flow away from said third junction;
   (g) means connected to said first and third junctions for maintaining a substantially uniform current flow out of and into said first and third junctions, respectively;
   (h) fifth and sixth diodes connected, respectively, from said second junction and from said fourth junction to ground, said fifth diode being poled to allow current flow towards ground and said sixth diode being poled to allow current flow away from ground; and
   (i) seventh and eighth diodes connected, respectively, from said second junction and from said fourth junction to said input of said operational amplifier, said seventh diode being poled to allow current flow towards said second junction and said eighth diode being poled to allow current flow away from said fourth junction.

5. The apparatus as defined in claim 4 including means interposed between said first junction and said first capacitor for limiting the rate at which said first capacitor can be charged and means interposed between said third junction and said second capacitor for limiting the rate at which said second capacitor can be charged.

6. The apparatus as defined in claim 4 including means interposed between said fifth diode and ground for limiting current flow therethrough and means interposed between said sixth diode and ground for limiting current flow therethrough.

References Cited

UNITED STATES PATENTS

| | | | |
|---|---|---|---|
| 3,048,717 | 8/1962 | Jenkins | 307—237 XR |
| 3,127,565 | 3/1964 | Williams | 328—127 |
| 3,328,705 | 6/1967 | Eubanks | 328—151 |
| 3,328,704 | 6/1967 | Wantland | 328—132 |

DONALD D. FORRER, Primary Examiner

STANLEY T. KRAWCZEWICZ, Assistant Examiner

U.S. Cl. X.R.

307—231, 317; 318—18, 28; 328—143, 151, 165, 171